United States Patent
Leo et al.

(10) Patent No.: US 10,809,062 B2
(45) Date of Patent: Oct. 20, 2020

(54) MEMS INERTIAL SENSOR DEVICE WITH DETERMINATION OF THE BIAS VALUE OF A GYROSCOPE THEREOF AND CORRESPONDING METHOD

(71) Applicant: STMICROELECTRONICS S.R.L., Agrate Brianza (IT)

(72) Inventors: Marco Leo, Locate di Triulzi (IT); Marco Castellano, Pavia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 542 days.

(21) Appl. No.: 15/373,282

(22) Filed: Dec. 8, 2016

(65) Prior Publication Data

US 2017/0314923 A1    Nov. 2, 2017

(30) Foreign Application Priority Data

Apr. 29, 2016    (IT) .................... 102016000044109

(51) Int. Cl.
*G01P 15/00*    (2006.01)
*G01C 19/5776*    (2012.01)
*G01C 25/00*    (2006.01)

(52) U.S. Cl.
CPC ....... *G01C 19/5776* (2013.01); *G01C 25/005* (2013.01)

(58) Field of Classification Search
CPC .......................... G01C 19/5776; G01C 25/005
USPC ........................................................ 702/141
See application file for complete search history.

(56) References Cited

U.S. PATENT DOCUMENTS

| | | | |
|---|---|---|---|
| 5,297,028 A | 3/1994 | Ishikawa | |
| 6,498,996 B1* | 12/2002 | Vallot | G01C 19/56 702/103 |
| 2002/0158796 A1* | 10/2002 | Humphrey | G01C 21/165 342/357.31 |
| 2005/0174324 A1 | 8/2005 | Liberty et al. | |
| 2009/0007661 A1 | 1/2009 | Nasiri et al. | |
| 2012/0259578 A1* | 10/2012 | Bevilacqua | G06F 1/1694 702/141 |
| 2013/0066578 A1* | 3/2013 | Tu | G01C 25/005 702/87 |

(Continued)

OTHER PUBLICATIONS

"Application-specific integrated circuit," Wikipedia, XP-002765355, retrieved on Dec. 19, 2016 from https://en.wikipedia.org/w/index.php?title=Application-specific_integrated_circuit&oldid=712855847 . . . , 10 pages.

(Continued)

*Primary Examiner* — Michael P Nghiem
(74) *Attorney, Agent, or Firm* — Seed Intellectual Property Law Group LLP

(57) ABSTRACT

A MEMS inertial sensor device has a package and a gyroscopic sensor, an accelerometric sensor, and an ASIC electronic circuit integrated within the package. The ASIC is operatively coupled to the gyroscopic sensor and the accelerometric sensor for supplying at an output a gyroscopic signal indicative of an angular velocity and an acceleration signal indicative of an acceleration acting on the MEMS inertial sensor device. The ASIC is provided with a processing module, which may be of a purely hardware type, for processing jointly the gyroscopic signal and the accelerometric signal and determining a bias value present on the gyroscopic signal.

18 Claims, 6 Drawing Sheets

(56) References Cited

U.S. PATENT DOCUMENTS

| | | | |
|---|---|---|---|
| 2016/0327396 A1* | 11/2016 | Hallberg | G01C 21/165 |
| 2017/0314923 A1* | 11/2017 | Leo | G01C 19/5776 |
| 2018/0031597 A1* | 2/2018 | Oliaei | B81B 7/008 |
| 2018/0052006 A1* | 2/2018 | Ell | G01C 25/00 |
| 2018/0120127 A1* | 5/2018 | Kotwal | G01C 21/16 |
| 2018/0149480 A1* | 5/2018 | Wang | E21B 44/005 |

OTHER PUBLICATIONS

Veltink et al., "Detection of Static and Dynamic Activities Using Uniaxial Accelerometers," *IEEE Transactions on Rehabilitation Engineering* 4(4):375-385, Dec. 1996.

\* cited by examiner

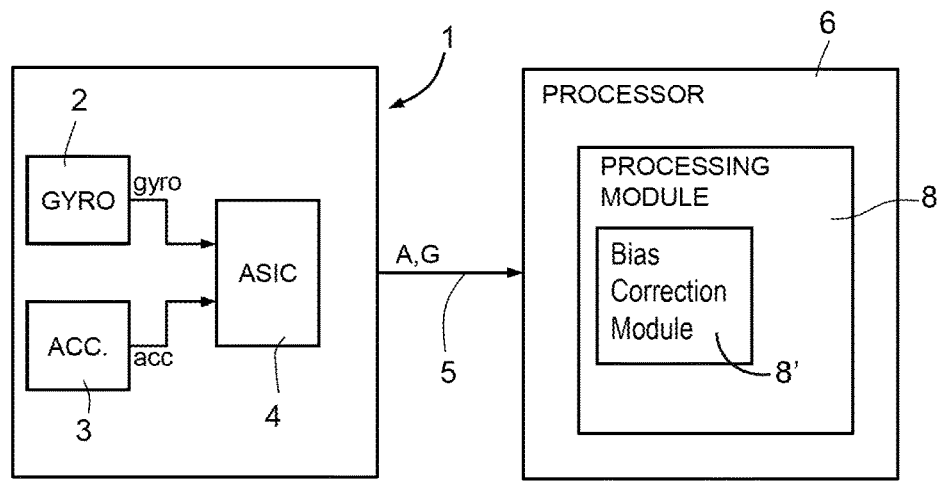
Fig.1 *(Prior Art)*
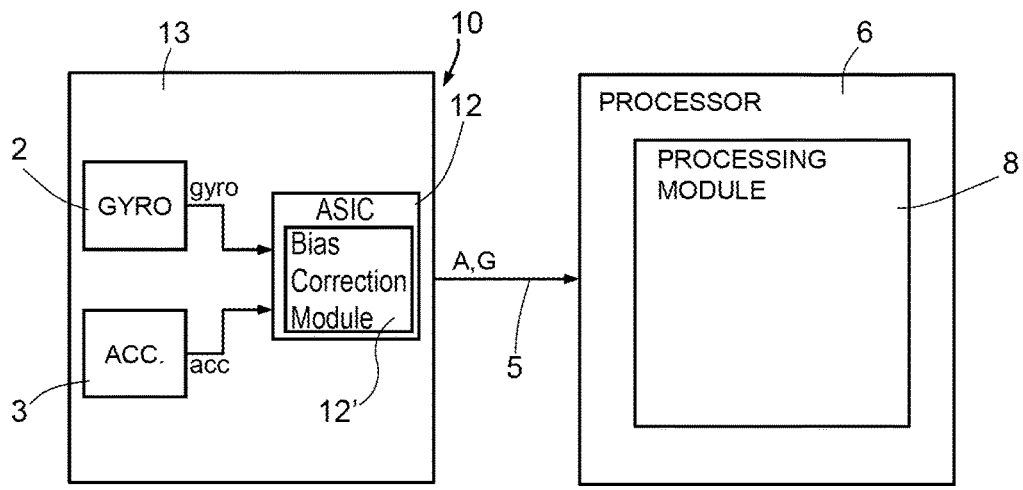
Fig.2
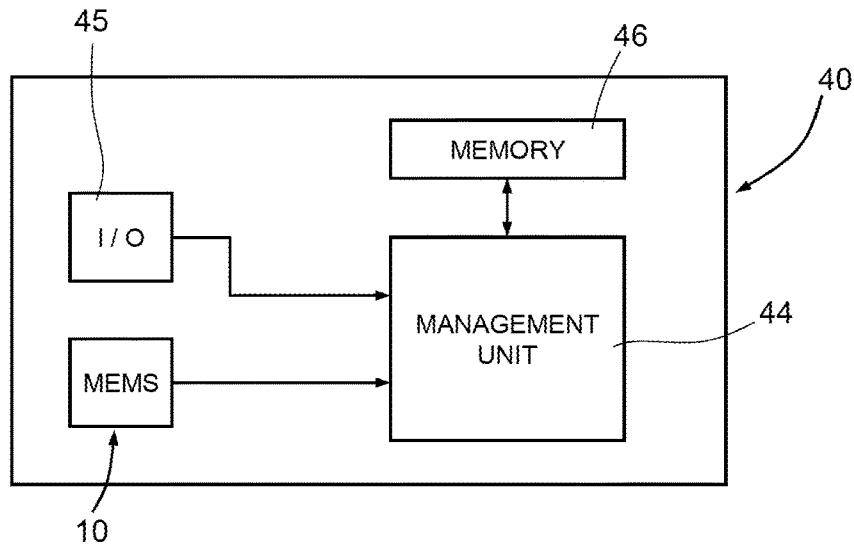
Fig.9

MEMS INERTIAL SENSOR DEVICE WITH DETERMINATION OF THE BIAS VALUE OF A GYROSCOPE THEREOF AND CORRESPONDING METHOD

BACKGROUND

Technical Field

The present disclosure relates to a MEMS (Micro-Electro-Mechanical Systems) inertial sensor device, with determination of the bias value of a gyroscope thereof. The present disclosure further relates to a method for determining the aforesaid bias value for the MEMS inertial sensor device.

Description of the Related Art

As is known, there are several systems in which detecting the position or angular orientation of a device in space is required, for example in portable or wearable electronic apparatuses, for providing user interfaces, in fitness, gaming, or inertial navigation applications, in automotive systems, in robotic systems, and so on.

For this purpose, MEMS inertial sensor devices are used, designed to define inertial measurement units (IMUs), including accelerometers, gyroscopes, and possibly further sensors, such as magnetometers and temperature sensors, and processing circuits, which provide suitable processing of the information detected by the sensors in order to determine angular orientation.

In this regard, use of algorithms for aggregating the quantities detected by the various sensors is known, the so-called sensor-fusion algorithms; for example, the combined use of the information of angular velocity and acceleration, detected respectively by a gyroscope and by an accelerometer, is known for determining the spatial rotation vectors associated with the MEMS inertial sensor device.

It is also known that a gyroscope is by its nature subject to drifts, in particular with temperature and time, which cause deviations of the quantities supplied at an output. In particular, the gyroscope returns a non-zero and variable (for example with time and temperature) mean value, the so-called bias, in a state of rest, with the device stationary and not subject to rotation, i.e., in the absence of an angular velocity to be detected.

For the purposes of a correct application of the aforesaid algorithms and for ensuring a better stability and convergence, it is consequently required to determine the bias of the gyroscope for enabling its correction. It is required, in particular, that this determination is updated in time and as a function of temperature, in general for tracking variations of the same bias during operation of the sensor device.

As represented schematically in FIG. 1, a MEMS inertial sensor device 1 includes, for example, a gyroscope 2 and an accelerometer 3, which are, for example, both of a triaxial type, each having an appropriate MEMS detection structure (integrated in a known manner with micromachining techniques used in the semiconductor industry in a die of semiconductor material, for example silicon). The gyroscope 2 supplies a gyroscopic signal gyro, upon detection of the angular velocity acting on the MEMS inertial sensor device 1, and the accelerometer supplies an acceleration signal acc, upon detection of the accelerations acting on the same MEMS inertial sensor device 1.

The MEMS inertial sensor device 1 further comprises an ASIC (Application-Specific Integrated Circuit) 4, electrically coupled to the gyroscope 2 and to the accelerometer 3, designed to perform appropriate processing operations (for example, via amplification and analog-to-digital conversion) on the acceleration signal acc and the gyroscopic signal gyro, for supplying at an output from the MEMS inertial sensor device 1 acceleration data A and gyroscopic data G (for example, of a digital type).

The MEMS inertial sensor device 1 is coupled, in use, for example through an interface bus 5, to an external processor 6, the so-called host processor or application processor, for example the processor of an electronic apparatus in which the same MEMS inertial sensor device 1 is used.

As shown schematically in FIG. 1, the external processor 6 comprises a processing module 8, for example implementing sensor-fusion algorithms, for processing the acceleration data A and the gyroscopic data G supplied by the MEMS inertial sensor device 1, for example for managing spatial positioning or inertial navigation applications in the electronic apparatus.

Known solutions envisage that the operation of determination, and subsequent cancelling, of the gyroscope bias are suitably carried out by the external processor 6, in particular by a bias correction module or dedicated portion 8' of the processing module 8.

The present Applicant has, however, realized that this solution is not in general optimized and requires a considerable consumption of electrical energy, in so far as it envisages frequent access by the external processor 6 to the MEMS inertial sensor device 1 for execution of the operations for determination and cancelling of the bias on the gyroscopic signal gyro, and in particular in so far as it envisages an extensive use of the dedicated portion 8' of the processing module 8 and of the interface bus 5.

On the other hand, it is a known requirement, in particular in the field of portable or wearable electronic apparatuses, to reduce electrical energy consumption, and at the same time to improve, or at least not degrade, the performance. This requirement evidently clashes with the high demand of resources of the solutions normally used for management of the gyroscope bias.

BRIEF SUMMARY

Embodiments of the present disclosure provide improved solutions for determining the bias of the gyroscope of the MEMS inertial sensor device, which will require in particular a limited use of electrical energy.

According to one embodiment of the present disclosure, a MEMS inertial sensor device includes a package. A gyroscopic sensor is configured to supply at an output a gyroscopic signal indicative of an angular velocity acting on said MEMS inertial sensor device. An accelerometric sensor is configured to supply an acceleration signal indicative of an acceleration acting on said MEMS inertial sensor device. An ASIC electronic circuit is integrated within the package with the gyroscopic and accelerometric sensors. The ASIC electronic circuit is operatively coupled to the gyroscopic sensor and accelerometric sensor and includes a processing module configured to process jointly the gyroscopic signal and acceleration signal in order to determine a bias value present on said gyroscopic signal.

BRIEF DESCRIPTION OF THE SEVERAL VIEWS OF THE DRAWINGS

For a better understanding of the present disclosure, a preferred embodiment thereof is now described, purely by way of non-limiting example and with reference to the attached drawings, wherein:

FIG. 1 is an overall block diagram of a MEMS inertial sensor device of a known type, coupled to an external processor, which implements an operation of bias determination and cancelling;

FIG. 2 is an overall block diagram of a MEMS inertial sensor device according to one embodiment of the present disclosure, which includes a bias-determination stage or module, and is coupled to an external processor;

FIG. 9 is an overall block diagram of an electronic apparatus incorporating the MEMS inertial sensor device according to embodiments of the present disclosure.

DETAILED DESCRIPTION

Figure 3:
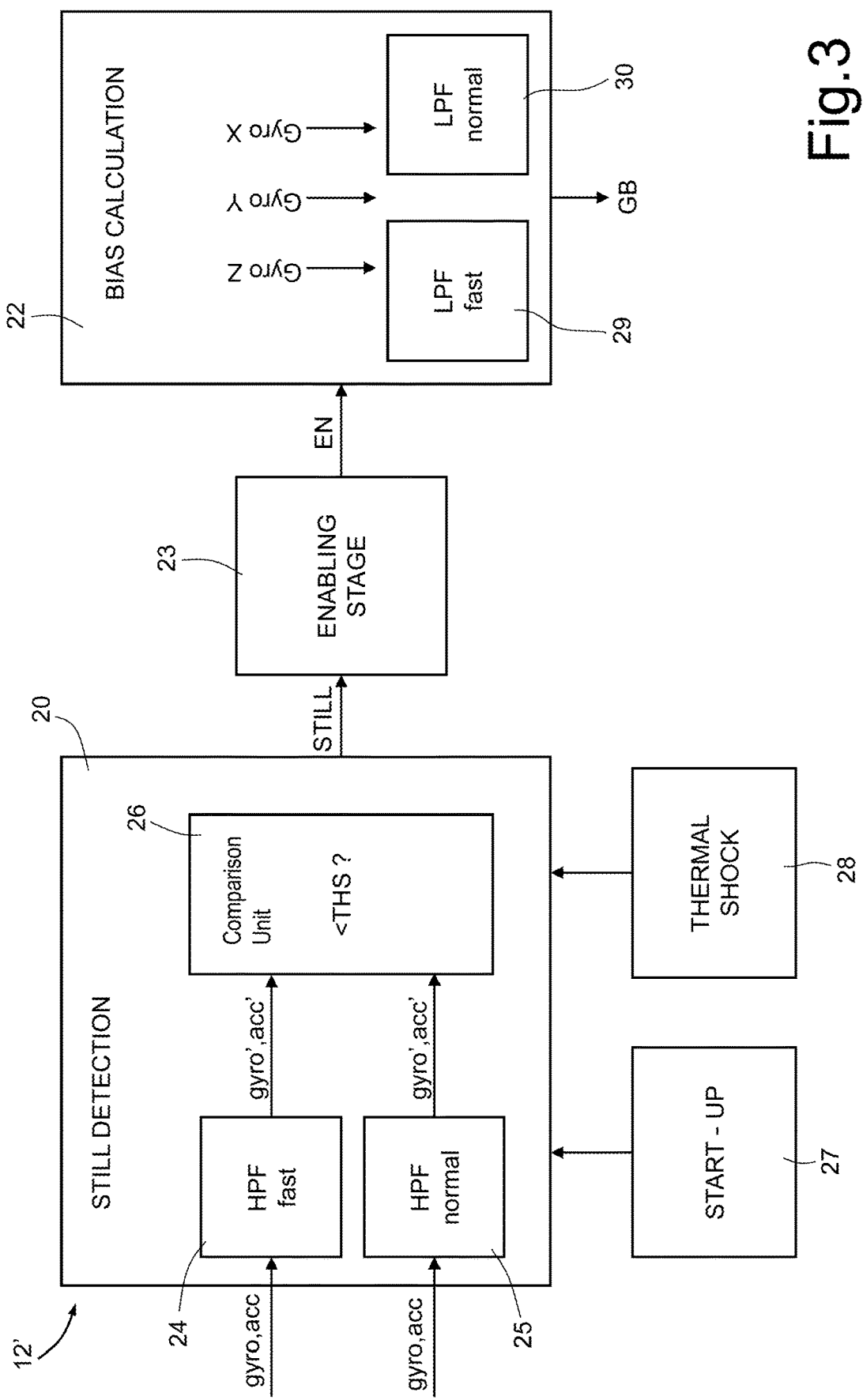
FIG. 3 is a functional block diagram of the bias-determination module of the MEMS inertial sensor device of FIG. 2.

As will be described in detail hereinafter, one aspect of the present solution envisages that the operation for determining the bias of the gyroscope is carried out directly within the MEMS inertial sensor device, in particular by a dedicated portion of the corresponding ASIC, instead of being carried out outside the same sensor device by an external processor (host processor or application processor).

As shown schematically in FIG. 2, the MEMS inertial sensor device, here designated by 10, thus comprises, as discussed previously: the gyroscope 2 and the accelerometer 3, for example both of a triaxial type, each having an appropriate MEMS detection structure; and an ASIC, here designated by 12, electrically coupled to the gyroscope 2 and to the accelerometer 3, designed to supply at the output the acceleration data A and the gyroscopic data G.

The ASIC 12 and the inertial sensors, i.e., the gyroscope 2 and the accelerometer 3, are provided for example in respective dies of semiconductor material and are housed, appropriately coupled, in a same package, designated as a whole by 13 of the MEMS inertial sensor device 10, designed for electrical connection with the outside, for example with a printed-circuit board (PCB) of an electronic apparatus in which the MEMS inertial device 10 is arranged.

According to a particular aspect of the present solution, the ASIC 12 comprises a bias correction or processing module 12', configured to determine, starting from the inertial signals, i.e., the acceleration signal acc and the gyroscopic signal gyro, the bias value of the gyroscope 2.

In one embodiment, the processing module 12', which is of a purely hardware type, comprises a control part (for example, a picocontroller) with an arithmetic-logic unit (ALU) and a hard-coded program (ROM) containing the instructions (program) for the picocontroller.

The determined bias value may be used directly within the processing module 12', for compensating the variation of the gyroscopic signal gyro in the gyroscopic data G supplied at the output, or else may be sent to the external processor, also in this case designated by 6, operatively coupled to the MEMS inertial device 10, by the interface bus 5.

Advantageously, the architecture provided enables a considerable reduction of access by the external processor 6 to the MEMS inertial device 10 and to the interface bus 5, thus considerably limiting the use of electrical energy associated with the operations for determining the bias of the gyroscope 2.

The external processor 6 also in this embodiment comprises the respective processing module 8, for example implementing sensor-fusion algorithms, for processing the acceleration data A and the gyroscopic data G supplied by the MEMS inertial sensor device 10, e.g., for managing applications of spatial positioning or inertial navigation. This respective processing module 8 in this case does not implement algorithms designed to determine the bias of the gyroscope 2 of the MEMS inertial sensor device 10.

In greater detail, and with reference first to FIG. 3, the processing module 12' of the ASIC 12 of MEMS inertial sensor device 10 comprises:

a rest-condition (the so-called still-condition) detection stage 20, which receives at its input the gyroscopic signal gyro and the acceleration signal acc from the gyroscope 2 and from the accelerometer 3, respectively, and is configured to detect a resting (or static) condition of the MEMS inertial sensor device 10;

a bias-determination module or stage 22, which receives at its input the gyroscopic signal gyro from the gyroscope 2 (in particular corresponding components $gyro_x$, $gyro_y$, $gyro_z$ detected along the three sensing axes x, y, and z of a set of three Cartesian axes) and is configured to determine and supply at its output a corresponding bias value GB; and an enabling stage 23, operatively coupled to the still-condition detection stage 20 and configured to enable the bias-determination stage 22 only in the case where the still-condition detection stage 20 detects the presence of a resting condition of the MEMS inertial sensor device 10; the bias value determined by the bias-determination stage 22 is consequently a value referred to a resting condition (which in what follows will be designated by GBstill).

In detail, the still-condition detection stage 20 comprises:

a first high-pass filter (HPF) unit 24, for example of a digital type, which receives at its input the gyroscopic signal gyro and the acceleration signal acc and carries out a first high-pass filtering of these signals, for supplying a filtered gyroscopic signal gyro' and a filtered acceleration signal acc;

a second high-pass filter unit 25, which is also, for example, of a digital type and receives at its input the gyroscopic signal gyro and the acceleration signal acc and carries out a second high-pass filtering of these signals, for supplying the filtered gyroscopic signal gyro' and the filtered acceleration signal acc; and a comparison unit 26, which receives the filtered gyroscopic signal gyro' and the filtered acceleration signal acc', selectively and alternatively from the first high-pass filter unit 24 or second high-pass filter unit 25, and carries out a comparison between the filtered gyroscopic signal gyro' and filtered acceleration signal acc' and respective thresholds THS that are indicative of the presence of a resting condition, and supplies at its output a still-condition detection signal STILL, having a first logic value in the case of detection of the resting condition, and a second logic value otherwise.

In greater detail, the first high-pass filtering carried out by the first high-pass filter unit 24 is of a fast type; i.e., it has a fast response to variations. Instead, the second high-pass filtering carried out by the second high-pass filter unit 25 is of a normal type; i.e., it has a response to variations that is slower than the response of the first high-pass filter unit 24.

For example, the transfer function H(z) of the first and second high-pass filter units 24, 25 is of the type:

$$H(z) = \frac{1 - z^{-1}}{1 - (1 - 2^{-N}) \cdot z^{-1}}$$

where the parameter N determines the implementation of the first or second high-pass filtering.

For example, the first high-pass filtering envisages a value of the parameter N equal to 2, whereas the second high-pass filtering envisages a value of the parameter N greater than that of the first high-pass filtering, for example equal to 6.

In general, a single high-pass filter unit may be provided, having a cut-off frequency (i.e., the aforesaid parameter N) that is configurable in order to implement selectively and alternatively the first or second high-pass filtering.

Figure 4:
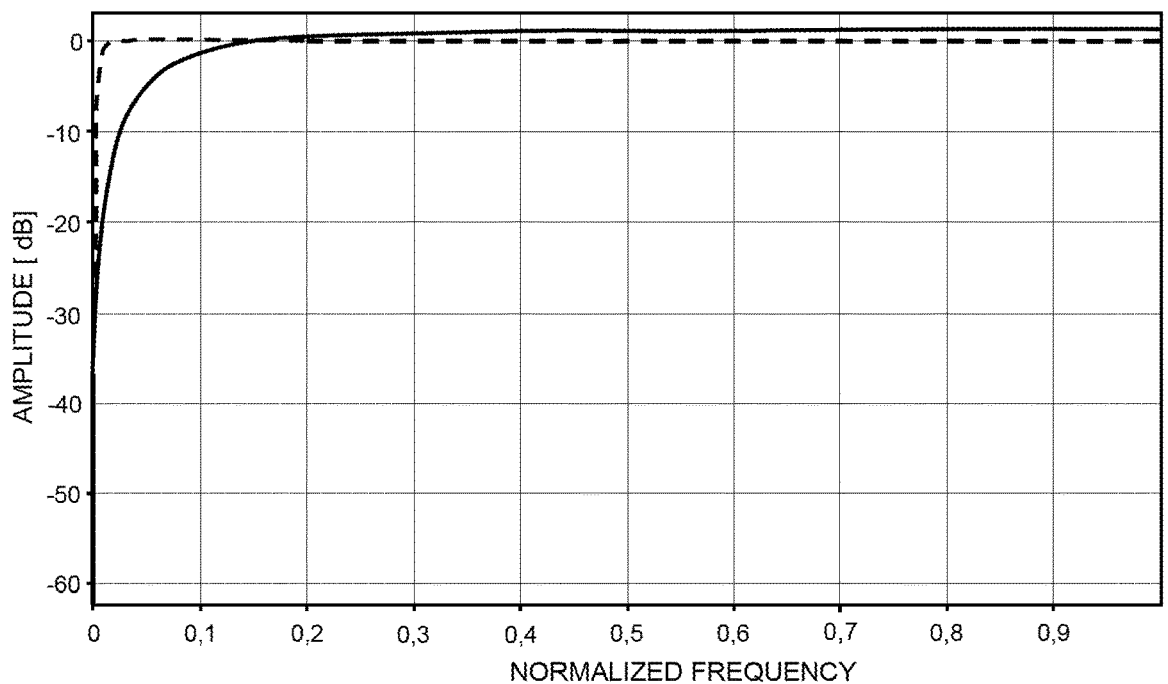
FIGS. 4 and 5 show plots of the frequency transfer functions of a high-pass filter unit and of a low-pass filter unit, respectively, of the bias-determination module of FIG. 3.

FIG. 4 illustrates the transfer function H(z) of the first high-pass filter unit 24 (with a solid line) and of the second high-pass filter unit 25 (with a dashed line). It may be noted that the cut-off frequency of the first high-pass filter unit 24 has a value greater than the corresponding cut-off frequency of the second high-pass filter unit 25.

Again with reference to FIG. 3, the processing module 12' further comprises:

a start-up detection unit 27, configured to detect a start-up condition of the MEMS inertial sensor device 10, for example following upon electrical supply of the MEMS inertial sensor device 10, or following upon return from a stand-by condition; and a thermal-shock detection unit 28, configured to detect a given condition of temperature variation of the MEMS inertial sensor device 10.

In detail, the thermal-shock detection unit 28, which comprises an appropriate temperature sensor (which is also integrated in the package 13), is for example configured to detect a temperature variation $\Delta T$, in a given time interval $\Delta t$, greater than a pre-set value (which is indicative of a normal thermal operating condition); for example, a thermal shock may be detected in the presence of a variation of temperature greater than, or equal to, 2° C. in a time interval of 1 s.

In the case where the start-up detection unit 27 or the thermal-shock detection unit 28 detects the presence of a start-up condition or a thermal-shock condition, respectively, it enables the first high-pass filter unit 24 (with the second high-pass filter unit 25 that is consequently disabled).

In this way, a filtering of a fast type of the gyroscopic signal gyro and of the acceleration signal acc is advantageously enabled for reacting promptly to the variations of the same signals (which occur both at start-up and in the presence of thermal shock).

In a possible embodiment, the second high-pass filter unit 25 is then enabled (with the first high-pass filter unit 24 that is consequently disabled) after a wait time interval of an appropriate value has elapsed, for restoring a "normal" (slower) filtering of the gyroscopic signal gyro and of the acceleration signal acc once the corresponding variations have ended (or have decreased).

In any case, the comparison unit 26 is configured to verify the resting condition in the case where:

all the components of the gyroscopic signal gyro (i.e., the components along the three sensing axes x, y, z, in the case of a triaxial sensor) are below a given threshold THS; and further the modulus of the acceleration signal acc is lower than a respective threshold THS.

In particular, the modulus of the acceleration signal acc may be determined, in a digital implementation, by an appropriate algorithm, such as for example the CORDIC algorithm. Alternatively, the comparison unit 26 may execute the following operations:

a1=max($a_x$, $a_y$, $a_z$), where $a_x$, $a_y$, $a_z$ are the values of the components of the acceleration signal acc along the three sensing axes x, y, z;

a2=|$a_x$|+|$a_y$|+|$a_z$|; and

M=k1·a1+k2·a2, where k1 and k2 are two pre-set coefficients, and M is the modulus of the acceleration signal acc, which is to be determined.

In the case where the resting condition is found, the comparison unit 26 sends the resting signal STILL to the enabling stage 23, which in turn supplies an enable signal EN to the bias-determination stage 22 for enabling calculation of the bias value GB in the gyroscopic signal gyro.

In detail, the bias-determination stage 22 comprises:

a first low-pass filter unit 29, of a digital type, which receives at its input the gyroscopic signal gyro (in particular, the corresponding components $gyro_x$, $gyro_y$, and $gyro_z$ along the three sensing axes x, y, z) and carries out a first low-pass filtering of the same signal; and a second low-pass filter unit 30, also of a digital type, which receives at its input the gyroscopic signal gyro and carries out a second low-pass filtering of the same signal.

In greater detail, the first low-pass filtering carried out by the first low-pass filter unit 29 is of a fast type, i.e., has a fast response to variations; instead, the second low-pass filtering carried out by the second low-pass filter unit 30 is of a normal type, i.e., has a response to variations that is slower than the response of the first low-pass filter unit 29.

For example, the transfer function H(z) of the first and second low-pass filter units 29, 30 is of the type $$H(z) = \frac{2^{-N}}{1 - (1 - 2^{-N}) \cdot z^{-1}}$$

where the parameter N determines the first or second low-pass filtering; for example, the first low-pass filtering envisages a value of the parameter N equal to 2, whereas the second low-pass filtering envisages a value of the parameter N greater than that of the first low-pass filtering, for example equal to 8.

In general, a single low-pass filter unit may be provided, having a cut-off frequency (i.e., the aforesaid parameter N) that may be configured in order to implement selectively and alternatively the first or second low-pass filtering.

Figure 5:
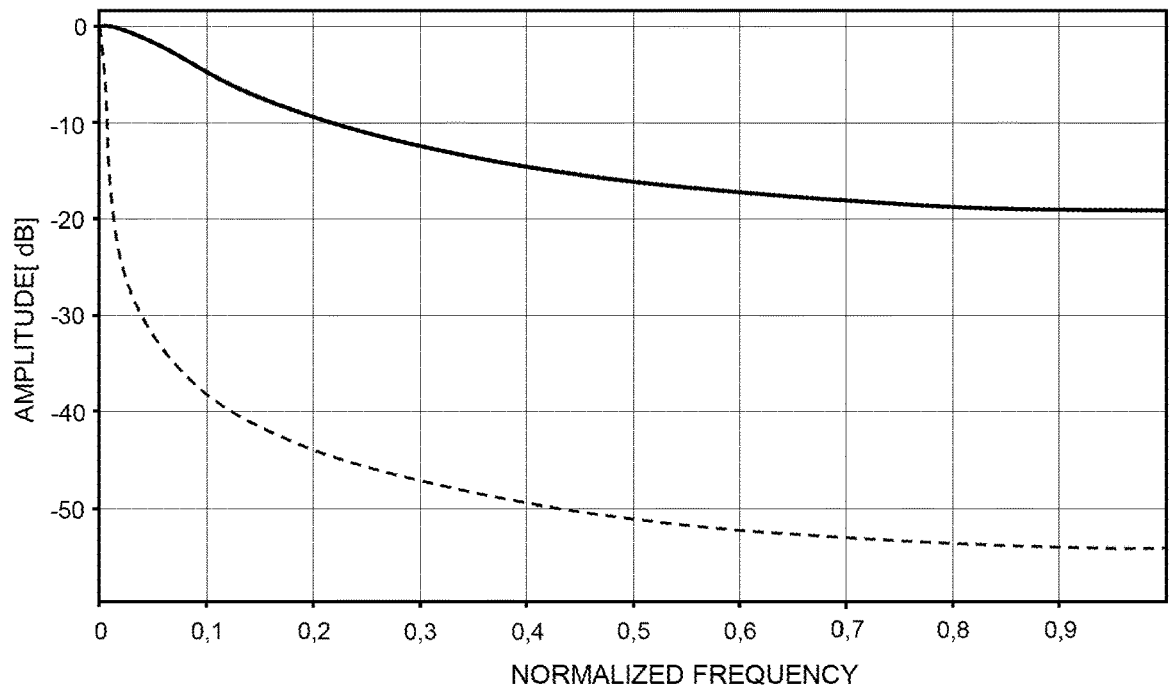

FIG. 5 illustrates the transfer function H(z) of the first low-pass filter unit 29 (with a solid line) and of the second low-pass filter unit 30 (with a dashed line); it may be noted that the cut-off frequency of the first low-pass filter unit 29 has a value greater than the corresponding cut-off frequency of the second low-pass filter unit 30.

In particular, the first low-pass filter unit 29 is enabled (with the second low-pass filter unit 30 that is consequently disabled) in the case where the start-up detection unit 27 or the thermal-shock detection unit 28 detect the presence of a start-up condition or a thermal-shock condition, respectively.

In this way, advantageously a filtering of a fast type of the gyroscopic signal gyro is enabled to react promptly to the variations of the same signal (which occur both at start-up and in the presence of thermal shock).

In a possible embodiment, the second low-pass filter unit 30 is then enabled (with the first low-pass filter unit 29 that is consequently disabled) after a wait time interval of an appropriate value has elapsed, for restoring a "normal" (slower) filtering of the gyroscopic signal gyro.

In any case, the bias value GB supplied at the output corresponds to the appropriate low-pass filtering of the gyroscopic signal gyro carried out alternatively by the first low-pass filter unit 29 or by the second low-pass filter unit 30, in a condition of rest of the MEMS inertial sensor device 10.

As will now be described in detail, a further embodiment of the present solution envisages that the bias value is updated (in particular, in an approximate way) also in the case where the MEMS inertial sensor device 10 is not in a resting condition, for taking into account possible variations of the bias value (in particular, as a function of the variation of the operating temperature) that occur during movement of the MEMS inertial sensor device 10.

Figure 6:
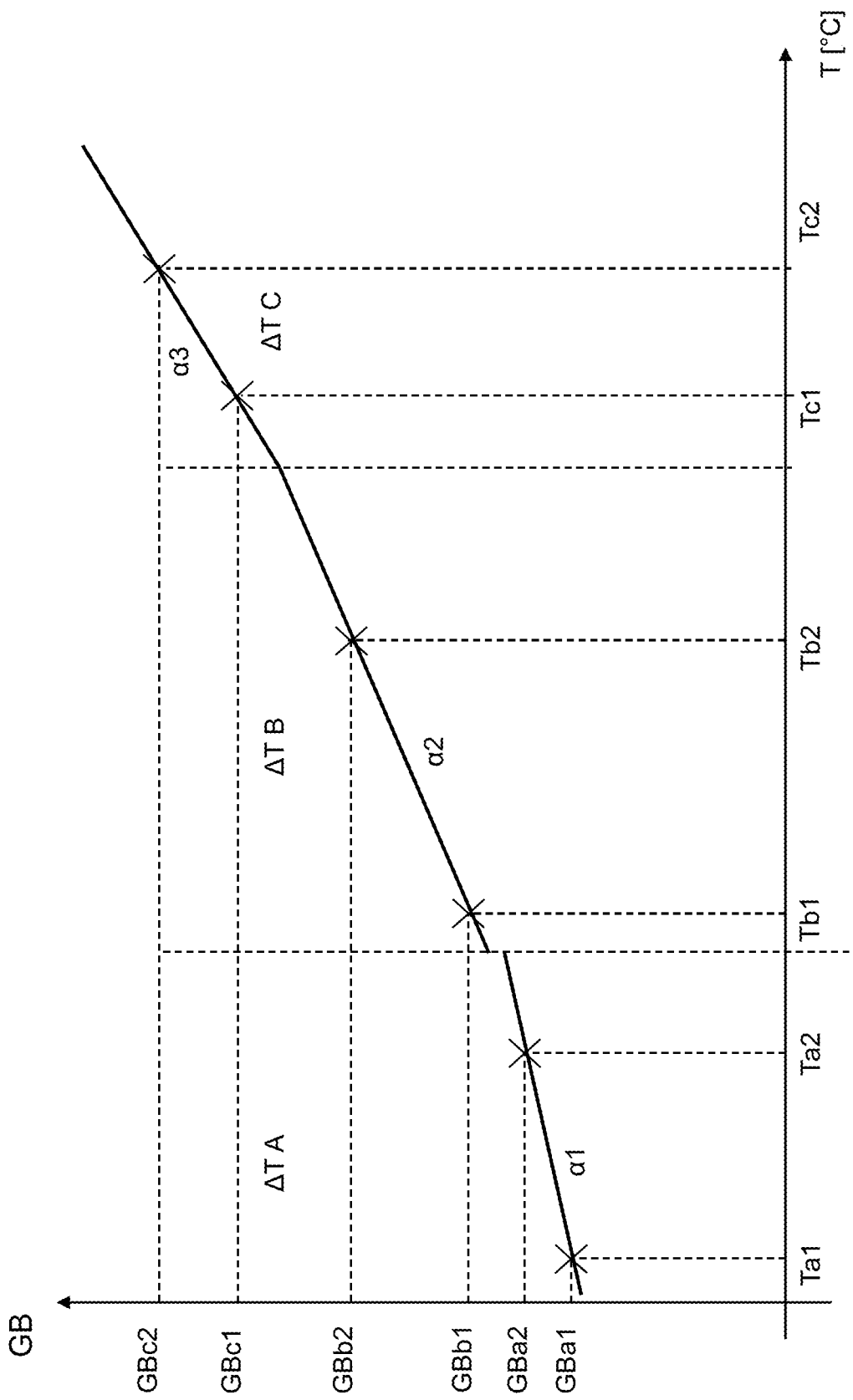
FIGS. 6 and 7 show plots of the bias as a function of temperature in the MEMS inertial sensor device of FIG. 2.

As is shown schematically in FIG. 6, the range of the operating temperatures of the MEMS inertial sensor device 10 is divided into a certain number of temperature intervals $\Delta T$, which are, for example, consecutive; in the example illustrated in FIG. 6, this number is equal to three, and the temperature intervals are designated by $\Delta TA$, $\Delta TB$, and $\Delta TC$.

For each of the temperature intervals $\Delta T$ a coefficient $\alpha$ is determined, which corresponds to the slope of the segment of the interpolating straight line that approximates, in that temperature interval, the pattern of variation of the bias value GB as a function of temperature.

In detail, in each temperature interval $\Delta T$, at least two bias values in the resting condition are determined, and the value of the corresponding coefficient $\alpha$ is thus determined.

With reference to FIG. 6, on the hypothesis that in the first temperature interval $\Delta TA$ the bias values in the resting condition GBa1, GBa2 are detected at the temperatures Ta1, Ta2, the coefficient $\alpha 1$ is determined with the following expression:

$$\alpha 1 = \frac{GBa2 - GBa1}{Ta2 - Ta1}$$

Similar considerations apply to the second temperature interval $\Delta TB$, where the bias values in the resting condition GBb1, GBb2 are detected at the temperatures Tb1, Tb2, and the coefficient $\alpha 2$ is determined with the expression:

$$\alpha 2 = \frac{GBb2 - GBb1}{Tb2 - Tb1}$$

Again in a similar manner, in the third temperature interval $\Delta TC$, where the bias values in the resting condition GBc1, GBc2 are detected at the temperatures Tc1, Tc2, the coefficient $\alpha 3$ is determined via the expression:

$$\alpha 3 = \frac{GBc2 - GBc1}{Tc2 - Tc1}$$

For each temperature interval $\Delta T$, once the coefficient $\alpha$ has been determined, it is possible to determine in an approximate way the bias value GB(Tnow) at a given current temperature Tnow (with the MEMS inertial sensor device 10 that is not in the resting condition), via the following expression:

*GB*(*T*now)=*GB*still+α·(*T*now−*T*still)

where GBstill is the bias value determined (by the bias-determination stage 22) for the last resting condition verified, at the resting temperature Tstill.

In detail, if the current temperature Tnow falls in the first temperature interval $\Delta TA$, the previous expression becomes

*GB*(*T*now)=*GB*still+α1·(*T*now−*T*still);

if the current temperature Tnow falls in the second temperature interval $\Delta TB$, the expression becomes

*GB*(*T*now)=*GB*still+α2·(*T*now−*T*still); and if the current temperature Tnow falls in the third temperature interval $\Delta TC$, the expression becomes

*GB*(*T*now)=*GB*still+α3·(*T*now−*T*still)

The value of the coefficient $\alpha$, in each temperature interval $\Delta T$, may further be updated in the case where, in a resting condition of the MEMS inertial sensor device 10, a further bias value GB is identified for a further temperature T, which is higher, or lower, than the maximum and minimum temperature limits considered previously for calculation of the same coefficient $\alpha$.

With reference, by way of example, to the first temperature interval $\Delta TA$, in the case where a resting condition is identified for a temperature Ta3>Ta2 (with Ta3 still included in the same first temperature interval $\Delta Ta$), the coefficient $\alpha 1$ is updated via the following expression:

$$\alpha 1 = \frac{GBa3 - GBa1}{Ta3 - Ta1}$$

Likewise, in the case where, instead, a resting condition is identified for a temperature Ta4<Ta1 (with Ta4 still included in the same first temperature interval $\Delta Ta$), the coefficient $\alpha 1$ is updated via the following expression:

$$\alpha 1 = \frac{GBa2 - GBa4}{Ta2 - Ta4}$$

Figure 7:
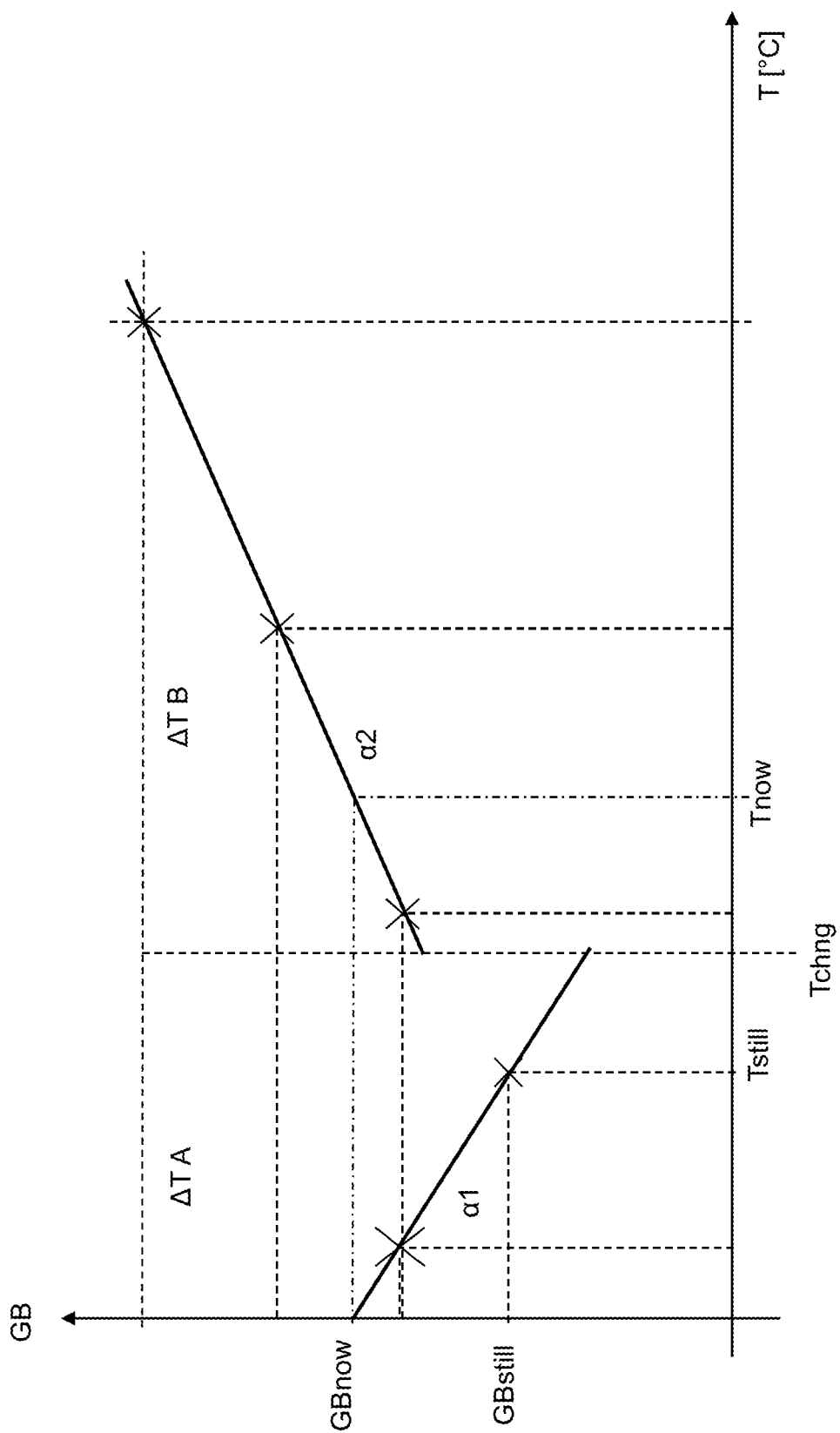

Moreover, there is the possibility that the current temperature Tnow and the resting temperature Tstill (at which the last bias value in the resting condition GB still has been determined) fall in different temperature intervals $\Delta T$, as shown schematically in FIG. 7.

In this case, the processing module 12' of the ASIC 12 is configured to determine a correction of the bias value, and thus calculate the approximate value GB(Tnow), by the following expression (referring to the case provided by way of example in FIG. 7), which takes into account possible changes of slope due to the different coefficients $\alpha 1$, $\alpha 2$ in the two temperature intervals $\Delta TA$ and $\Delta TB$:

*GB*(*T*now)=*GB*still+α1·(*T*chng−*T*still)+α2·(*T*now−*T*chng)

where Tchng is the temperature of transition between a first time interval, in the example $\Delta TA$, and the next time interval, in the example $\Delta TB$.

Figure 8:
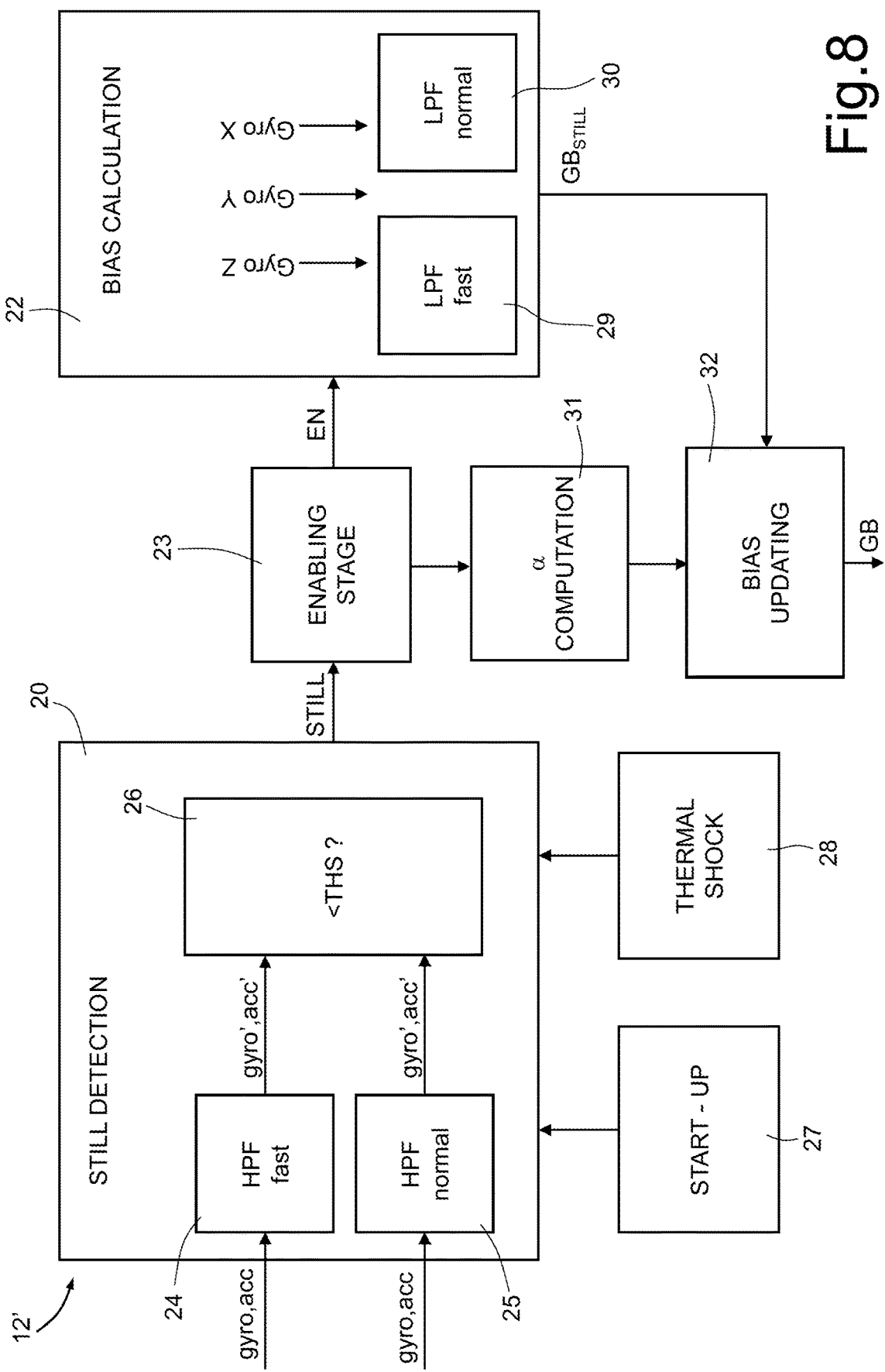
FIG. 8 is a functional block diagram of the bias-determination module of the MEMS inertial sensor device of FIG. 2 according to a further embodiment.

In detail, and with reference to FIG. 8, in this embodiment, the processing module 12' of the ASIC 12 of MEMS inertial sensor device 10 further comprises a coefficient-calculation stage 31, configured to determine the coefficient $\alpha$ in the various temperature intervals $\Delta T$, according to the modalities described previously.

In particular, the coefficient-calculation stage 31 is coupled to the bias-determination stage 22 and to the enabling stage 23 for determining the value of the coefficient α starting from at least two bias values in the resting condition GBstill determined at at least two temperatures of a same temperature interval ΔT. As discussed previously, the coefficient-calculation stage 31 is further configured to update the calculation of the coefficient α in the case where a further bias value is determined in the resting condition at a temperature higher or lower than the same temperature interval ΔT.

The processing module 12' further comprises a bias-updating stage 32, operatively coupled to the coefficient-calculation stage 31 and to the bias-determination stage 22 for updating, when the MEMS inertial sensor device 10 is not in the resting condition, the last bias value in the resting condition GBstill determined by the bias-determination stage 22, providing an approximate bias value GB(Tnow).

In particular, the bias value GB(Tnow) is calculated, as discussed previously in detail, as a function of the current temperature Tnow, of the coefficient α calculated by the coefficient-calculation stage 31 (for the temperature interval ΔT to which the current temperature Tnow belongs and possibly for the previous temperature interval) and further as a function of the last bias value in the resting condition GBstill.

The bias value GB supplied at the output by the processing module 12' thus corresponds to the value effectively determined by the bias-determination stage 22 (GBstill), in the resting condition and, also in a non-resting condition, until the coefficient α is calculated. The bias value GB supplied at the output corresponds, instead, to the approximate value GB(Tnow) calculated by the bias-updating stage 32 in the case where the device is not in the resting condition and the aforesaid coefficient α has already been calculated.

The advantages of the solution proposed are clear from the foregoing description.

In any case, it is again underlined that the solution described enables effective determination of the bias value GB of the gyroscope 2 of MEMS inertial sensor device 10, with a very low consumption of electrical energy as compared to traditional solutions, thanks to the implementation of a dedicated processing module 12', of a hardware type, in the ASIC 12 of the same MEMS inertial sensor device 10.

The solution described further allows freeing the external processor 6 of the electronic apparatus in which the MEMS inertial sensor device 10 is used from the tasks of calculation of the bias value, thus improving the overall efficiency of the electronic apparatus.

The solution described advantageously makes it possible to track in a fast way the variations of bias that occur during the conditions of start-up and thermal shock. In particular, upon detection of these conditions, the solution envisages implementation of a fast filtering, different from the filtering adopted in "normal" operating conditions (for example adopting different filter coefficients), thereby improving the convergence of measurements.

Advantageously, the duration of this fast filtering (prior to return into normal conditions) may be configurable.

Furthermore, the present solution enables determination of an approximate bias value GB(Tnow) even in the case where the MEMS inertial sensor device 10 is not in the resting condition, thereby following the variations of bias that may arise on account, for example, of temperature variations.

The aforesaid features thus provide for an advantageous use of the MEMS inertial sensor device 10 in an electronic apparatus 40, in particular of a portable type, as shown schematically in FIG. 9.

The electronic apparatus 40 may be a portable apparatus for mobile communications, such as a mobile phone, a smartphone, a PDA (Personal Digital Assistant), a digital audio player with voice-recording capacity, a photographic camera or a video camera, a controller for videogames, etc., or a wearable apparatus, such as a smartwatch or an electronic bracelet; the electronic apparatus 40 is generally able to process, store, and/or transmit and receive signals and information.

The electronic apparatus 40 comprises, in addition to the MEMS inertial sensor device 10 for determining the movement characteristics of the electronic apparatus 40, a management unit 44, including the aforesaid external processor 6, which, as a function of the detected movement characteristics, implements, for instance, suitable actions in an input/output (I/O) interface 45, for example including a display, coupled to the same management unit 44. The management unit 44 is further provided with a non-volatile memory 46, for example of a RAM type.

Finally, it is clear that modifications and variations may be made to what is described and illustrated herein, without thereby departing from the scope of the present disclosure, as defined in the annexed claims.

For example, as mentioned previously, the MEMS inertial sensor device 10 may comprise further sensors, of an inertial type or of a different kind, for example a magnetometer or a pressure sensor, which are also housed within the same package 13.

Furthermore, it is evident that the number of temperature intervals ΔT in which the entire range of operating temperatures of the MEMS sensor device 10 is divided may be increased in order to improve precision of the approximation in the calculation of the bias value of the gyroscope 2, at the expense, however, of a greater complexity of calculation.

It is also evident that the implementation of the high-pass filter unit 24, 25 and low-pass filter unit 29, 30 may differ from what has been illustrated previously, it being possible for the purpose to use any known implementation of a digital or analog type filter.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A Micro-Electro-Mechanical Systems (MEMS) inertial sensor device comprising:
 a package;
 a gyroscopic sensor configured to supply at an output a gyroscopic signal indicative of an angular velocity;
 an accelerometric sensor configured to supply an acceleration signal indicative of an acceleration acting on said MEMS inertial sensor device;
 an Application-Specific Integrated Circuit (ASIC) electronic circuit integrated within the package with the gyroscopic and accelerometric sensors, said ASIC electronic circuit being operatively coupled to said gyroscopic sensor and accelerometric sensor, wherein said ASIC electronic circuit includes processing circuitry configured to process jointly said gyroscopic signal and acceleration signal in order to determine a bias value present on said gyroscopic signal, wherein, to enable the processing circuit to process jointly said gyroscopic signal and acceleration signal in order to determine the bias value present on said gyroscopic signal, the processing circuitry includes:
  a still-condition detection circuit configured to receive at an input the gyroscopic signal and the accelerometric signal and configured to detect a resting condition of the MEMS inertial sensor device; and
  a bias-determination circuit including a low-pass filter configured to receive the gyroscopic signal and determine said bias value by a low-pass filtering of said gyroscopic signal, wherein the processing circuitry is configured to enable the bias-determination circuit determine said bias value in response to detection of said resting condition by the still-condition detection circuit.

2. The MEMS inertial sensor device according to claim 1, wherein said processing circuitry is of a hardware type.

3. The MEMS inertial sensor device according to claim 1, wherein the still-condition detection circuit further comprises:
  a high-pass filter configured to execute a high-pass filtering of said gyroscopic signal and accelerometric signal; and
  a comparison circuit configured to receive a filtered gyroscopic signal and a filtered acceleration signal from said high-pass filter and to perform a comparison with a respective threshold that is indicative of the presence of the resting condition, and configured to supply at an output a still-condition detection signal.

4. The MEMS inertial sensor device according to claim 3, wherein said processing circuitry further comprises:
  a start-up detection circuit configured to detect a condition of start-up of the MEMS inertial sensor device; and
  a temperature-variation detection circuit configured to detect a given temperature-variation condition of the MEMS inertial sensor device, wherein said high-pass filter and said low-pass filter are configured to vary a filtering mode following detection of said start-up condition or of said temperature-variation condition.

5. The MEMS inertial sensor device according to claim 4, wherein said high-pass filter and said low-pass filter are configured to implement a faster filtering mode following detection of said start-up condition or of said temperature-variation condition, and are configured to implement a slower filtering mode in a normal operating condition.

6. The MEMS inertial sensor device according to claim 1, wherein said processing circuitry is configured to supply a bias value, when the MEMS inertial sensor device is not in a resting condition, based on a most recent bias value in the resting condition determined by the bias-determination circuit.

7. The MEMS inertial sensor device according to claim 6, wherein said processing circuitry is further configured to determine a bias value as a function of a current temperature and of an approximation coefficient which represents a slope of a linear approximation of a pattern of bias values as a function of temperature.

8. The MEMS inertial sensor device according to claim 7, wherein said processing circuitry is further configured to divide a range of operating temperatures of the MEMS inertial sensor device into a number of temperature intervals, and to determine a value of the approximation coefficient for each temperature interval starting from at least two bias values determined in the resting condition and at least two temperatures of each temperature interval.

9. The MEMS inertial sensor device according to claim 8, wherein the value of the approximation coefficient for a given time interval is calculated with the following expression:

$$\alpha = \frac{GBa2 - GBa1}{Ta2 - Ta1}$$

where $GBa2$ and $GBa1$ are two bias values in the resting condition, determined at temperatures $Ta2$ and $Ta1$; and wherein a bias value is designated as $GB(Tnow)$ and is calculated by the following expression:

$GB(Tnow) = GBstill + \alpha \cdot (Tnow - Tstill)$ where $GBstill$ is a bias value in the resting condition determined at resting temperature $Tstill$, $Tnow$ is current temperature in the case where the resting temperature $Tstill$ and the current temperature $Tnow$ belong to a same temperature interval; and wherein the bias value $GB(Tnow)$ is calculated by the following expression:

$GB(Tnow) = GBstill + a1 \cdot (Tchng - Tstill) + a2 \cdot (Tnow - Tchng)$ wherein:
  the resting temperature $Tstill$ and the current temperature $Tnow$ belong to a first temperature interval and a second temperature interval, respectively,
  the first and second temperature intervals are distinct from each other,
  $\alpha1$ is the approximation coefficient of the first temperature interval, $\alpha2$ is the approximation coefficient of the second temperature interval, and $Tchng$ is a temperature of transition between the first and second temperature intervals.

10. An electronic apparatus, comprising:
a Micro-Electro-Mechanical Systems (MEMS) inertial sensor device including,
  a package;
  a gyroscopic sensor configured to supply at an output a gyroscopic signal indicative of an angular velocity;
  an accelerometric sensor configured to supply an acceleration signal indicative of an acceleration acting on said MEMS inertial sensor device; and
  an Application-Specific Integrated Circuit (ASIC) electronic circuit integrated within the package with the gyroscopic and accelerometric sensors, said ASIC electronic circuit being operatively coupled to said gyroscopic sensor and accelerometric sensor, wherein said ASIC electronic circuit includes a processing circuit configured to process jointly said gyroscopic signal and acceleration signal in order to determine whether the MEMS inertial sensor device is in a resting condition, determine a resting bias value present on said gyroscopic signal, in response to determining that the MEMS inertial sensor device is in the resting condition, and provide a bias value, in response to the processing circuitry determining that the MEMS inertial sensor device is not in the resting condition, based on the resting bias value in the resting condition; and
a processor coupled to the MEMS inertial sensor device to receive gyroscopic and accelerometric data based on the gyroscopic signal and acceleration signal, the processor configured to process the gyroscopic and accelerometer data to manage functions of the electronic apparatus.

11. The electronic apparatus of claim 10, wherein the processor is configured to process the gyroscopic and acceleration data to manage spatial positioning or inertial navigation functions of the electronic apparatus.

12. The electronic apparatus of claim 10, wherein the processing circuit includes:
a still-condition detection circuit coupled to receive the gyroscopic signal and the acceleration signal and configured to detect the resting condition of the MEMS inertial sensor device; and
a bias-determination circuit including a low-pass filter configured to receive the gyroscopic signal, generate a filtered gyroscopic signal, and determine the bias value based upon the filtered gyroscopic signal, wherein the processing circuitry is configured to enable the bias-determination circuit determine said bias value in response to detection of said resting condition by the still-condition detection circuit.

13. The electronic apparatus of claim 12, wherein the still-condition detection circuit further comprises:
a high-pass filter configured to filter the gyroscopic and acceleration signals and to provide filtered gyroscopic and acceleration signals; and
a comparison circuit coupled to the high-pass filter to receive the filtered gyroscopic and acceleration signals from said high-pass filter and to compare each of the filtered gyroscopic and acceleration signals to an associated threshold to detect the presence of the resting condition, and further configured to provide a still-condition detection signal indicating whether the presence of the resting condition has been detected.

14. The electronic apparatus of claim 13, wherein the processing circuit further comprises:
a start-up detection circuit configured to detect a start-up condition of the MEMS inertial sensor device;
a temperature-variation detection circuit configured to detect a temperature-variation condition of the MEMS inertial sensor device; and
wherein the high-pass and low-pass filters are configured to adjust filtering of the corresponding signals following detection of the start-up condition or temperature-variation condition.

15. A bias-detection method for an inertial sensor device having a package, the method comprising:
receiving within the package a gyroscopic signal indicative of an angular velocity of said inertial sensor device;
receiving within the package an acceleration signal indicative of an acceleration acting on said inertial sensor device; and
processing within the package said gyroscopic signal and said acceleration signal to determine a bias value present on said gyroscopic signal, wherein the processing includes:
detecting a resting condition of the inertial sensor device as a function of the gyroscopic signal and of the acceleration signal; and
low-pass filtering said gyroscopic signal in order to determine said bias value upon detection of said resting condition, wherein detecting the resting condition of the inertial sensor device further comprises:
high-pass filtering said gyroscopic signal and acceleration signal to generate filtered gyroscopic and acceleration signals; and
comparing each of the filtered gyroscopic and acceleration signals to a respective threshold that is indicative of the resting condition.

16. The bias-detection method of claim 15 further comprising:
detecting a start-up condition of the inertial sensor device;
detecting a given condition of temperature variation of the inertial sensor device; and
varying a mode of said low-pass filtering and of said high-pass filtering based upon detection of the start-up condition and detection of the given condition of temperature variation of the inertial sensor device.

17. The method according to claim 16, wherein varying the mode of said low-pass filtering and of said high-pass filtering comprises implementing a faster filtering mode following detection of said start-up condition or detection of said condition of temperature variation, and implementing a slower filtering mode in normal operating conditions when neither the start-up condition nor the condition of temperature variation is detected.

18. The bias-detection method according to claim 17 further comprising:
determining an approximation coefficient which represents a slope of a linear approximation of a pattern of bias values as a function of temperature; and
providing a bias value determined as a function of a current temperature and the approximation coefficient.

\* \* \* \* \*